(12) United States Patent
Kushimoto

(10) Patent No.: US 9,574,733 B2
(45) Date of Patent: Feb. 21, 2017

(54) VEHICLE HEADLIGHT

(71) Applicant: Stanley Electric Co., Ltd., Tokyo (JP)

(72) Inventor: Takuya Kushimoto, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 162 days.

(21) Appl. No.: 14/589,428

(22) Filed: Jan. 5, 2015

(65) Prior Publication Data

US 2015/0124466 A1 May 7, 2015

Related U.S. Application Data

(63) Continuation of application No. 13/083,522, filed on Apr. 8, 2011, now Pat. No. 8,956,025.

(30) Foreign Application Priority Data

Apr. 8, 2010 (JP) .................................. 2010-089082

(51) Int. Cl.
*F21S 10/06* (2006.01)
*B60Q 1/08* (2006.01)
(Continued)

(52) U.S. Cl.
CPC ........... *F21S 48/1757* (2013.01); *B60Q 1/085* (2013.01); *F21S 48/1131* (2013.01);
(Continued)

(58) Field of Classification Search
CPC ................ F21S 48/1154; F21S 48/1159; F21S 48/12–48/1291
(Continued)

(56) References Cited

U.S. PATENT DOCUMENTS

2004/0218401 A1 11/2004 Okubo et al.
2005/0105301 A1 5/2005 Takeda et al.
(Continued)

FOREIGN PATENT DOCUMENTS

EP 2 063 170 A2 5/2009
EP 2 098 775 A2 9/2009
(Continued)

OTHER PUBLICATIONS

Japanese Office Action for the related Japanese Patent Application No. 2010-089082 dated Nov. 19, 2013.
(Continued)

*Primary Examiner* — Mariceli Santiago
(74) *Attorney, Agent, or Firm* — Kenealy Vaidya LLP

(57) ABSTRACT

A vehicle headlight including a common light distribution unit and a variable light distribution unit and a headlight system including the headlight can form a common light distribution pattern and a variable light distribution pattern using the common and the variable light distribution units. The variable distribution unit can include a light source, a phosphor panel, a mirror reflecting/scanning light emitted from the light source onto the phosphor panel and a projector lens projecting the scanning light adjacent the common light distribution pattern. The headlight system can include a front sensor detecting a surrounding condition, and can control the common and the variable light distribution units to form an optimum light distribution pattern in accordance with surrounding conditions. Thus, the disclosed subject matter can provide a headlight system including a headlight that can form an optimum light distribution pattern in accordance with surrounding conditions and can have a simple structure.

14 Claims, 14 Drawing Sheets

(51) Int. Cl.
*F21S 8/10* (2006.01)
*F21V 9/16* (2006.01)
*F21Y 101/00* (2016.01)

(52) U.S. Cl.
CPC ....... *F21S 48/1136* (2013.01); *F21S 48/1145* (2013.01); *F21S 48/125* (2013.01); *B60Q 2300/41* (2013.01); *B60Q 2300/42* (2013.01); *B60Q 2300/45* (2013.01); *F21V 9/16* (2013.01); *F21Y 2101/00* (2013.01); *F21Y 2115/30* (2016.08)

(58) Field of Classification Search
USPC ................................ 362/466, 510, 511, 516
See application file for complete search history.

(56) References Cited

U.S. PATENT DOCUMENTS

| | | |
|---|---|---|
| 2006/0028832 A1 | 2/2006 | Horii et al. |
| 2008/0013329 A1 | 1/2008 | Takeda et al. |
| 2008/0043481 A1* | 2/2008 | Yokoyama et al. .......... 362/465 |
| 2008/0162036 A1 | 7/2008 | Breed |
| 2009/0046474 A1* | 2/2009 | Sato ....................... B60Q 1/076 |
| | | 362/466 |

FOREIGN PATENT DOCUMENTS

| | | |
|---|---|---|
| JP | 2005-128147 A | 5/2005 |
| JP | 3982412 B2 | 9/2007 |
| JP | 2008-10228 A | 1/2008 |
| JP | 2008-71667 A | 3/2008 |
| JP | 4092283 B2 | 5/2008 |
| JP | 2009-48786 A | 3/2009 |
| JP | 2009-199752 A | 9/2009 |
| JP | 2009-211963 A | 9/2009 |
| JP | 2009-266437 A | 11/2009 |
| JP | 2010-36835 A | 2/2010 |

OTHER PUBLICATIONS

Japanese Office Action for Japanese Patent Application No. 2014-216203 and 2014-216206 dated Jun. 23, 2015.

* cited by examiner

VEHICLE HEADLIGHT

This application claims the priority benefit under 35 U.S.C. §120 and is a Continuation of co-pending U.S. patent application Ser. No. 13/083,522 filed on Apr. 8, 2011, which is hereby incorporated in its entirety by reference. This application also claims the priority benefit under 35 U.S.C. §119 of Japanese Patent Application No. 2010-089082 filed on Apr. 8, 2010, which is hereby incorporated in its entirety by reference.

BACKGROUND

1. Field

The presently disclosed subject matter relates to a vehicle headlight and a headlight system using the same, and more particularly to a vehicle headlight using a semiconductor light source and a mirror that can provide various light distribution patterns while having a simple structure and the headlight system using the same that can vary a light distribution pattern in accordance with surroundings such as an oncoming vehicle, a forward travelling vehicle, a road, etc.

2. Description of the Related Art

Vehicle headlights that can vary a light distribution pattern to maintain a high visibility in accordance with surroundings such as an existence of an oncoming vehicle, a forward travelling vehicle and the like have been developed in recent years. A conventional vehicle headlight using variable shades is disclosed in Patent Document No. 1 (Japanese Patent Application Laid Open JP2009-211963). FIG. 9a is a schematic side cross-section view showing this right and left conventional vehicle headlight, and FIG. 9b is a rear view showing a right and left variable shade used in the right left conventional vehicle of FIG. 9a.

The conventional vehicle headlight 100 includes: a reflector 101 having a first focus and a second focus; a discharge lamp 102 located near the first focus of the reflector 101; a variable shade 104 in which a top edge of the variable shade 104 is located near the second focus of the reflector 101; a projector lens 103 projecting light emitted from the discharge lamp 102 in a light-emitting direction of the vehicle headlight 100; and an actuator 105 slanting the variable shade 104 toward the projector lens 103 and the discharge lamp 102.

The variable shade 104 can include a right variable shade 104R composed of a right shade 104RR and a left shade 104RL and can be used for a right headlight of the vehicle headlight 100. A left variable shade 104L composed of a right shade 104LR and a left shade 104LL can be used as the variable shade 104 for a left headlight of the vehicle headlight 100. The right variable shade 104R and the left variable shade 104L shown in FIG. 9b are rear views from the discharge lamp 102.

FIG. 10 is a plurality of schematic diagrams depicting exemplary light distribution patterns formed by the vehicle headlight of FIG. 9a. When the vehicle headlight 100 is lit by a manual switch, pattern (a) of a low beam is formed by locating the right and left variable shades 104R, 104L at a vertical mode as shown in FIG. 9a. When pattern (b) of a high beam is changed by the manual switch, pattern (b) may be formed by slanting the both left shades 104RL and 104LL of the right and left variable shades 104R and 104L toward the discharge lamp 102 and by slanting both right shades 104RR and 104LR of the right and left variable shades 104R and 104L toward the projector lens 103.

When the vehicle headlight 100 is lit by an automatic switch, the following light distribution pattern may be changed by information from a camera, which is attached to a front window of a vehicle. When there is not an oncoming vehicle and a forward travelling vehicle in front of a vehicle, pattern (b) may be formed by the same method as the high beam. When an oncoming vehicle exists in a far forward direction of a vehicle, pattern (c) may be formed by slanting only the right shade 104LR of the left variable shade 104L toward the projector lens 103.

When an oncoming vehicle exists in a near forward direction of a vehicle, pattern (d) may be formed by slanting both right shades 104RR and 104LR of the right and left variable shades 104R and 104L toward the projector lens 103. When forward travelling vehicles exist in both far and near forward directions of a vehicle, pattern (e) may be formed by slanting only the left shade 104RL of the right variable shade 104R toward the discharge lamp 102. When a forward travelling vehicle exists in a left forward direction of a vehicle, pattern (f) may be formed by slanting both left shades 104RL and 104LL of the right and left variable shades 104R and 104L toward the discharge lamp 102.

Therefore, the vehicle headlight 100 can form the light distribution patterns (a) to (e) in accordance with surroundings such as the existence of an oncoming vehicle and a forward travelling vehicle. However, when the number of the light distribution patterns (a) to (e) further increases for additional patterns such as a light distribution pattern for a traffic sign, a light distribution pattern located near a vehicle for wet weather, etc., it may be difficult for the vehicle headlight 100 to increase additional patterns due to a constructive limitation.

Another conventional vehicle headlight using a matrix light source is disclosed in Patent Document No. 2 (Japanese Patent Application Laid Open JP2008-10228). FIG. 11 is a schematic side cross-section view showing the other conventional vehicle headlight, and FIG. 12 is a diagram showing exemplary light-emitting patterns formed by the matrix light source for the vehicle headlight of FIG. 11.

The conventional vehicle headlight 110 includes: a casing 111; the matrix light source 113 attached to the casing 111; a connector 115 connecting the matrix light source 113 for receiving a power supply and attached to the casing 111; an optical member 114 forming a matrix light emitted from the matrix light source 113; a transparent cover 112 passing the matrix light formed by the optical member 114 and attached to the casing 111.

The matrix light source 113 may emit a light-emitting pattern (a) for a high beam and a light-emitting pattern (b) for a low beam as shown in FIG. 12. Therefore, the conventional vehicle headlight 110 may form a light distribution pattern for a high beam similar to pattern (b) shown in FIG. 10 by light-emitting pattern (a) of the matrix light source 113, and may form a light distribution pattern for a low beam similar to pattern (a) shown in FIG. 10 by light-emitting pattern (b) of the matrix light source 113.

However, when the number of the light distribution patterns further increases, such as a light distribution pattern for a traffic sign, a light distribution pattern located near a vehicle for wet weather, and the like, it may be necessary for the vehicle headlight 110 to add additional light sources and/or to extend the optical member 114. Accordingly, the transparent cover 112 and the vehicle headlight 110 may become large, and also outside appearance possibilities for the vehicle headlight 110 may become diminished.

Another conventional vehicle headlight using a matrix mirror is disclosed in Patent Document No. 3 (Japanese Patent No. 3,982,412). FIG. 13 is a schematic side cross-section view showing the other conventional vehicle headlight, and FIG. 14 is a partial close-up perspective view showing the matrix mirror used for the vehicle headlight of FIG. 13.

The conventional vehicle headlight 120 includes: a light source 121; a reflector 122 reflecting light emitted from the light source 121; a collimator lens 123 passing the light emitted from the light source 121 and light reflected by the reflector 122; the matrix mirror 124 including a plurality of micro mirrors reflecting light L1 passing through the collimator lens 123; a diffusing lens 125 diffusing light L2 reflected by the matrix mirror 124; and a projector lens 126 projecting light diffused by the diffusing lens 125 in a light-emitting direction of the vehicle headlight 120.

In this case, the matrix mirror 124 includes the plurality of micro mirrors, for example 800×600 (=480,000 pieces). By digital-controlling the light L1 using the large number of micro mirrors so as to direct the light L2 toward the diffusing lens 125 for forming a light distribution pattern, various light distribution patterns similar to patterns (a) to (f) shown in FIG. 10 may be emitted via the projector lens 126 in accordance with a sensor, which detects an external condition of a vehicle.

However, the above-described structure in which the micro mirrors of 480,000 pieces are digitally-controlled at a duty ratio of, for example, 8 bit may become very complex. In addition, an alignment for the optical system such as the collimator lens 123, the matrix mirror 124 and the like may also become difficult and/or require high production and working tolerances.

The above-referenced Patent Documents are listed below, and are hereby incorporated with their English abstracts in their entireties.
1. Patent Document No. 1: Japanese Patent Application Laid Open JP2009-211963
2. Patent Document No. 2: Japanese Patent Application Laid Open JP2008-10228
3. Patent Document No. 3: Japanese Patent No. 3,982,412
4. Patent Document No. 4: Japanese Patent Application Laid Open JP2005-128147
5. Patent Document No. 5: Japanese Patent No. 4,092,283

The disclosed subject matter has been devised to consider the above and other problems, features, and characteristics. Thus, embodiments of the disclosed subject matter can include a variable light distribution unit using a semiconductor light source and a mirror that can provide various light distribution patterns with a compact structure. The disclosed subject matter can also include a vehicle headlight that includes a common light distribution unit forming a common light distribution pattern and the variable light distribution unit, which can form various light distribution patterns to enhance a visibility for a drive with a simple structure.

SUMMARY

The presently disclosed subject matter has been devised in view of the above and other problems, features, and characteristics. Another aspect of the disclosed subject matter includes a headlight system using a vehicle headlight that can form an optimum light distribution pattern in accordance with surrounding information such as an existence of an oncoming vehicle, a forward travelling vehicle, a pedestrian and the like detected by a sensor, such as a front sensor attached to a front of a vehicle.

According to an aspect of the disclosed subject matter, a vehicle headlight can include: a phosphor panel having a incident surface and a output surface facing the incident surface; a casing having a space located between a first end and a second end facing the first end, and the space the casing including a first inner surface and a second inner surface facing the first inner surface; a first light source located in the space toward the first end of the casing so that light emitted from the first light source is directed toward the first inner surface of the casing; a first mirror located adjacent the first inner surface of the casing, the light emitted from the first light source being reflected toward the phosphor panel, and the first mirror configured to be movable in two directions so as to freely vary a reflecting direction of the light and configured to scan the light emitted from the first light source on the incident surface.

In the above-described exemplary vehicle headlight, the phosphor panel can include a frame either having at least one hole, which includes a wavelength converting material in the at least one hole, or having at least one cavity, which includes the wavelength converting material in the at least one cavity located toward the incident surface of the phosphor panel, and the phosphor panel can include at least one of a glass and a silicone, and also can include the frame having either a plurality of the holes or a plurality of the cavities, and further includes a projector lens toward the output surface of the phosphor panel, which is integrated into the frame. Additionally, the first light source can be located adjacent the first end of the casing, and the phosphor panel can be located adjacent the second end of the casing.

In the above-described exemplary vehicle headlights, a common light distribution unit can be located adjacent the casing or in the casing. The vehicle headlights can further include a collimator lens located between the first light source and the first mirror, and wherein the first light source is an blue LED device and the phosphor panel includes a wavelength converting material that is selected from the group consisting of a yellow phosphor, and two phosphors of a red phosphor and a green phosphor, or wherein the first light source is an ultraviolet LED device and the phosphor panel includes a wavelength converting material including at least one of a red phosphor, a green phosphor and a blue phosphor.

Moreover, the first light source can be a laser device emitting blue light and the phosphor panel can include a wavelength converting material that is selected from the group consisting of a yellow phosphor, and two phosphors of a red phosphor and a green phosphor. The first light source can also be a laser device emitting ultraviolet light and the phosphor panel can include a wavelength converting material including at least one of a red phosphor, a green phosphor and a blue phosphor.

According to the above-described exemplary vehicle headlight, light emitted from the first light source can be scanned on the phosphor panel by the first mirrors so as to form a prescribed light distribution pattern and can be projected in a light-emitting direction of the vehicle headlight via the projector lens. Thus, the vehicle headlight can provide various light distribution patterns to enhance a visibility for a drive with a compact structure. In this case, because the vehicle headlight can also include the common light distribution unit forming a common light distribution pattern, the disclosed subject matter can provide the vehicle headlight that can form various light distribution patterns with a simple structure.

Another aspect of the disclosed subject matter, a headlight system including one of the above-described vehicle headlights can include: a front sensor configured to detect a surrounding information; an operation unit configured to receive the surrounding information from the front sensor and configured to determine an optimum light distribution pattern; and a drive unit configured to receive the optimum light distribution pattern from the operation unit and configured to control each of the common light distribution unit, the first light source and the first mirror in accordance with the optimum light distribution pattern.

In the above-described exemplary headlight system, the headlight system can include at least one of a memory and a communication unit configured to receive a map information.

According to the exemplary headlight system, the headlight system can detect the surrounding information using the front sensor and can determine the optimum light distribution pattern using the operation unit in accordance with the surrounding information. Thus, the disclosed subject matter can provide the headlight system that can form the optimum light distribution pattern in accordance with the surrounding information.

BRIEF DESCRIPTION OF THE DRAWINGS

These and other characteristics and features of the disclosed subject matter will become clear from the following description with reference to the accompanying drawings, wherein:

FIG. 9b is a rear view showing a right and left shade used in the right left conventional vehicle of FIG. 9a;

FIG. 10 is a plurality of schematic diagrams depicting exemplary light distribution patterns formed by the conventional vehicle headlight of FIG. 9a;

DETAILED DESCRIPTION OF EXEMPLARY EMBODIMENTS

Figure 1:
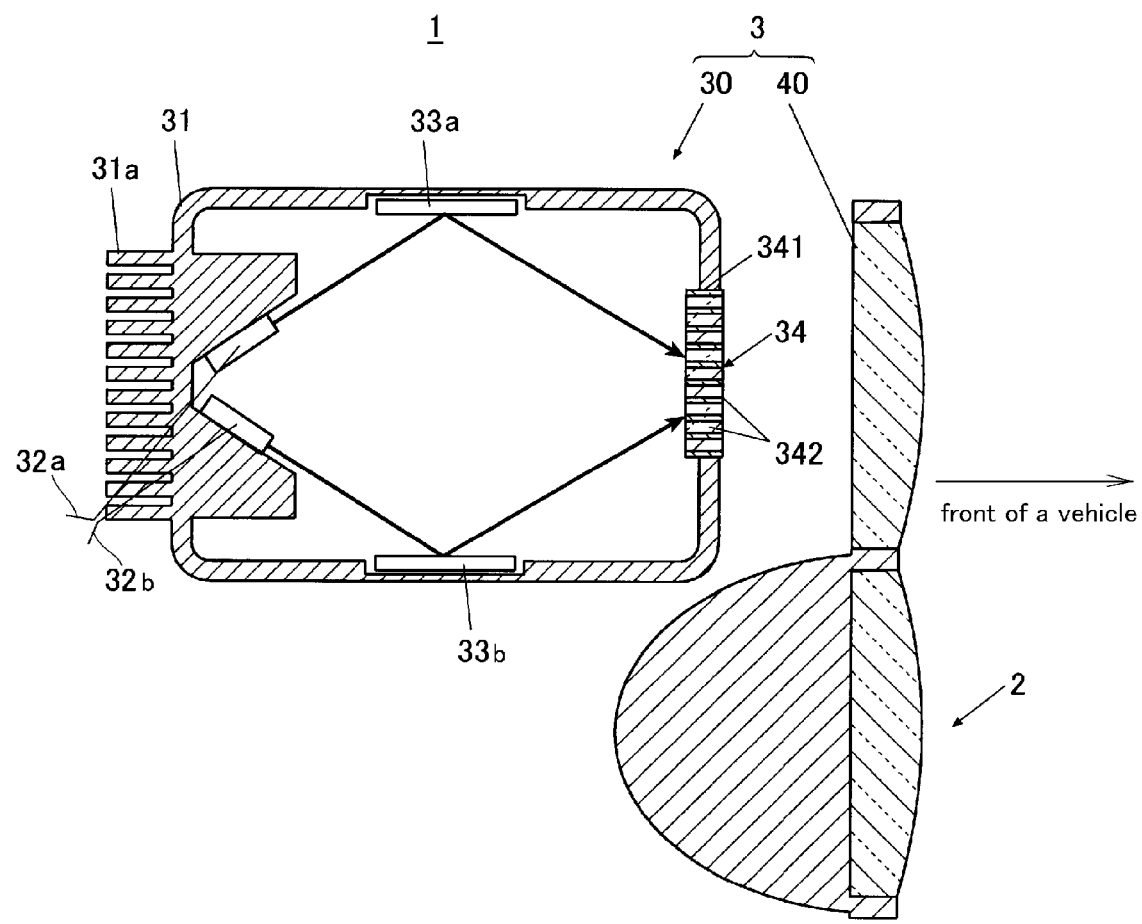
FIG. 1 is a schematic side cross-section view showing an exemplary embodiment of a vehicle headlight made in accordance with principles of the disclosed subject matter.

Exemplary embodiments of the disclosed subject matter will now be described in detail with reference to FIGS. 1 to 8. FIG. 1 is a schematic side cross-section view showing an exemplary embodiment of a vehicle headlight made in accordance with principles of the disclosed subject matter. The vehicle headlight 1 can include a common light distribution unit 2 and a variable light distribution unit 3.

Figure 2:
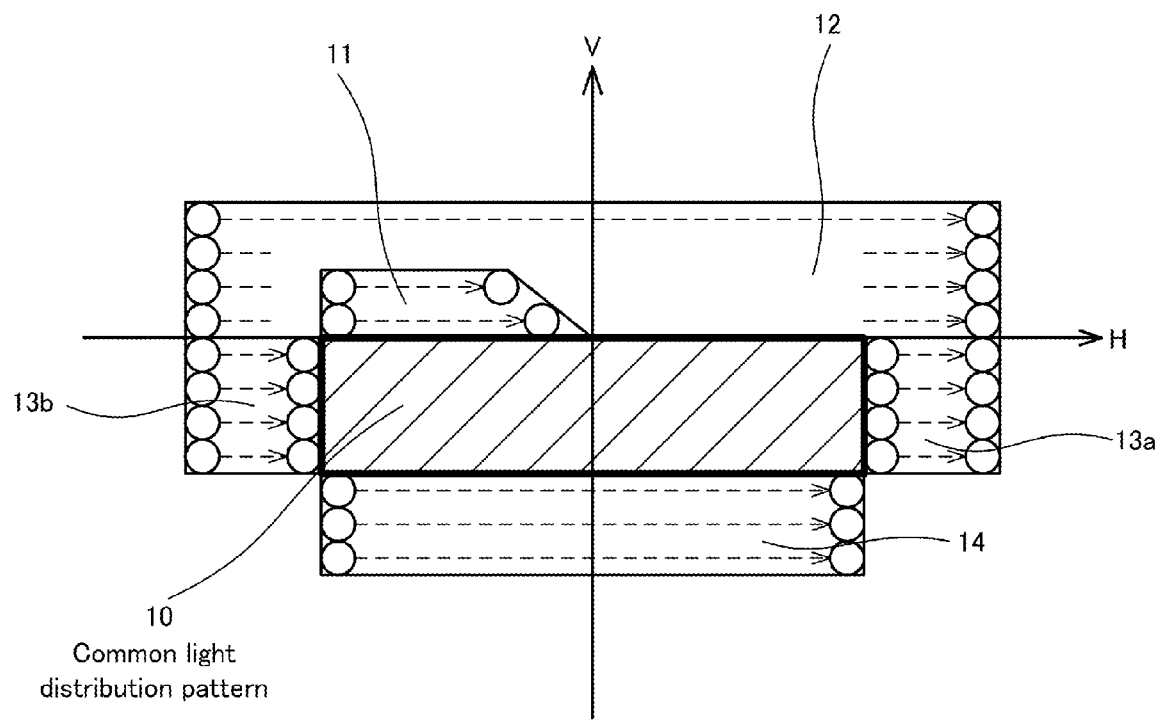
FIG. 2 is an explanatory diagram depicting an exemplary light distribution pattern formed by the vehicle headlight of FIG. 1.

FIG. 2 is an explanatory diagram depicting an exemplary light distribution pattern formed by the vehicle headlight 1. The common light distribution unit 2 can form a common light distribution pattern 10 located under a horizontal line H, which is a common part of various light distribution patterns formed by the vehicle headlight 1. Accordingly, the common light distribution unit 2 can be structured by a common projector type headlight, a common reflector type headlight and the like.

The variable light distribution unit 3 can form various light distribution patterns, for example, an elbow pattern 11 for a low beam, an upward pattern 12 for a high beam, a right and left cornering pattern 13a and 13b used when cornering rightward and leftward, respectively, and a downward pattern 14 for use during wet weather, etc. The upward pattern 12 for a high beam can be divided by a vertical line V, and the right and the left parts divided by the vertical line V can further be divided in a horizontal and vertical direction in accordance with surroundings, such as an existence and a location of an oncoming vehicle, a frontward travelling vehicle, etc. In addition, the variable light distribution unit 3 can form an illuminating pattern for a traffic sign and the like, which is not shown in FIG. 2.

The variable light distribution unit 3 can include a light source module 30 emitting a scanning light and a projector lens 40 projecting the scanning light in a forward direction of a vehicle as shown in FIG. 1. The light source module 30 can include: laser devices 32a, 32b emitting blue laser lights as a first and second light source; a radiator 31a located adjacent the laser devices 32a, 32b and radiating heat developed from the laser devices 32a, 32b; Micro Electro Mechanical Systems (MEMS) mirrors 33a, 33b reflecting each of the blue laser lights emitted from the laser devices 32a, 32b as a first and second mirror; a phosphor panel 34 passing light rays reflected on the MEMS mirrors 33a, 33b; and a casing 31.

The casing can include a first opening and a second opening facing the first opening, and also can include a first inner surface and a second inner surface facing the first inner surface. The radiator 31a can be attached to the first opening of the casing, and the phosphor panel 34 can be attached to the second opening of the casing. Additionally, the MEMS mirrors 33a, 33b can be adjacent the first and the second inner surfaces of the casing so that the MEMS mirrors 33a, 33b and the laser devices 32a, 32b are sealed with the casing 31, the radiator 31a and the phosphor panel 34.

Each of the MEMS mirrors 33a, 33b can be located in the casing 31 so as to face with respect to each other. The laser devices 32a, 32b can be located adjacent the radiator 31a and can each have an optical axis directed toward (and intersecting) each of the MEMS mirrors 33a, 33b, respectively. Therefore, each of the MEMS mirrors 33a and 33b can receive the respective blue laser lights emitted from the laser devices 32a, 32b and can reflect the respective blue laser lights toward the phosphor panel 34.

In this case, each of the MEMS mirrors 33a, 33b can be configured to be two-dimensionally slanted, and therefore can freely vary each of the reflecting directions of the blue laser lights emitted from the laser devices 32a, 32b. The MEMS mirrors 33a, 33b, can, for example, be configured as the optical mirrors disclosed in Patent Document No. 4 (Japanese Patent Application Laid Open JP2005-1281475) and Patent Document No. 5 (Japanese Patent No. 4,092,283).

Figure 3A:
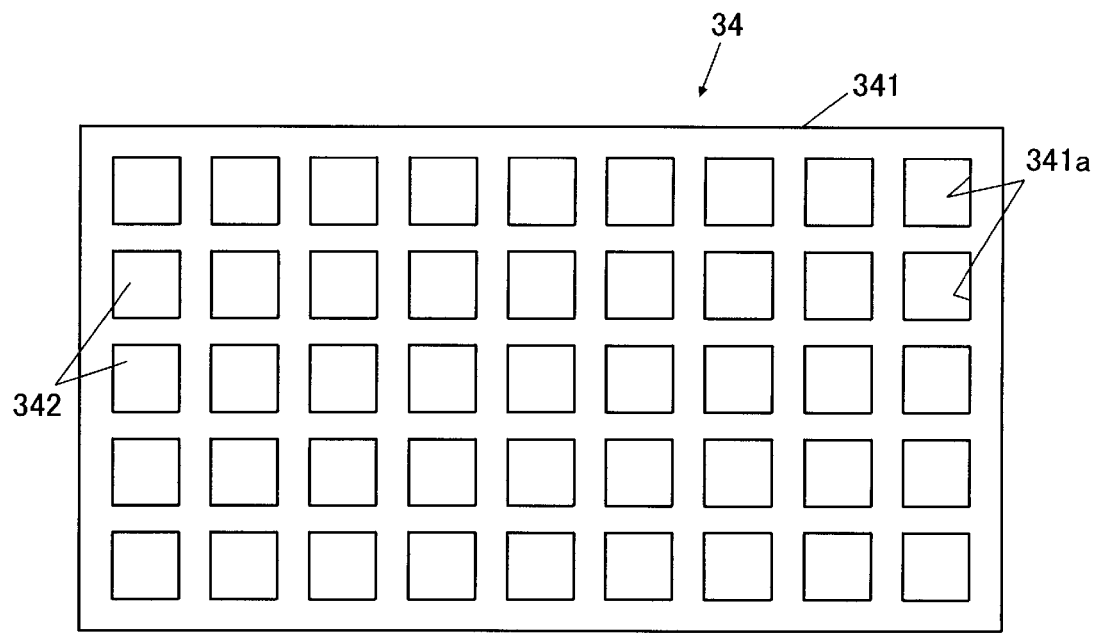
FIGS. 3a and 3b are a front view and a side cross-section view showing a phosphor panel for the vehicle headlight of FIG. 1, respectively.
Figure 3B:
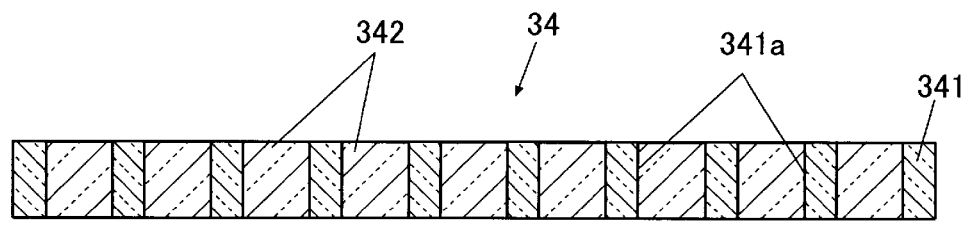

FIGS. 3a and 3b are a front view and a side cross-section view showing the phosphor panel 34, respectively. The phosphor panel 34 can include a frame 341 made of a glass, a silicone, or similar material, and the frame 341 can include a plurality of holes 341a that is formed in a matrix. A phosphor 342 can be disposed in the plurality of holes 341a as a wavelength converting material for the blue laser lights emitted from the laser devices 32a, 32b. The phosphor 342 can be a yellow phosphor, which can emit a yellow light being a complementary color of a blue light by exciting the phosphor with the blue laser lights emitted from the laser devices 32a, 32b.

Accordingly, a substantially white light can be emitted from the phosphor panel 34 toward the projector lens 40 by mixing the yellow light of the phosphor 342 with the blue light emitted from the laser devices 32a, 32b. The phosphor 342 can be a yellow phosphor which can include, $Y_3Al_5O_{12}$: $Ce^{3+}$ (YAG), $(Sr, Ba)_2SiO_4:Eu^{2+}$, $Ca_x (Si, Al)_{12} (O, N)_{16}$: $Eu^{2+}$ and the like. A length in a vertical direction of the holes 341a can be 80 micrometers or less, and a length in a horizontal direction of the holes 341a can be 100 micrometers or less. A thickness of the frame 341 can be 50 micrometers or less.

Figure 4:
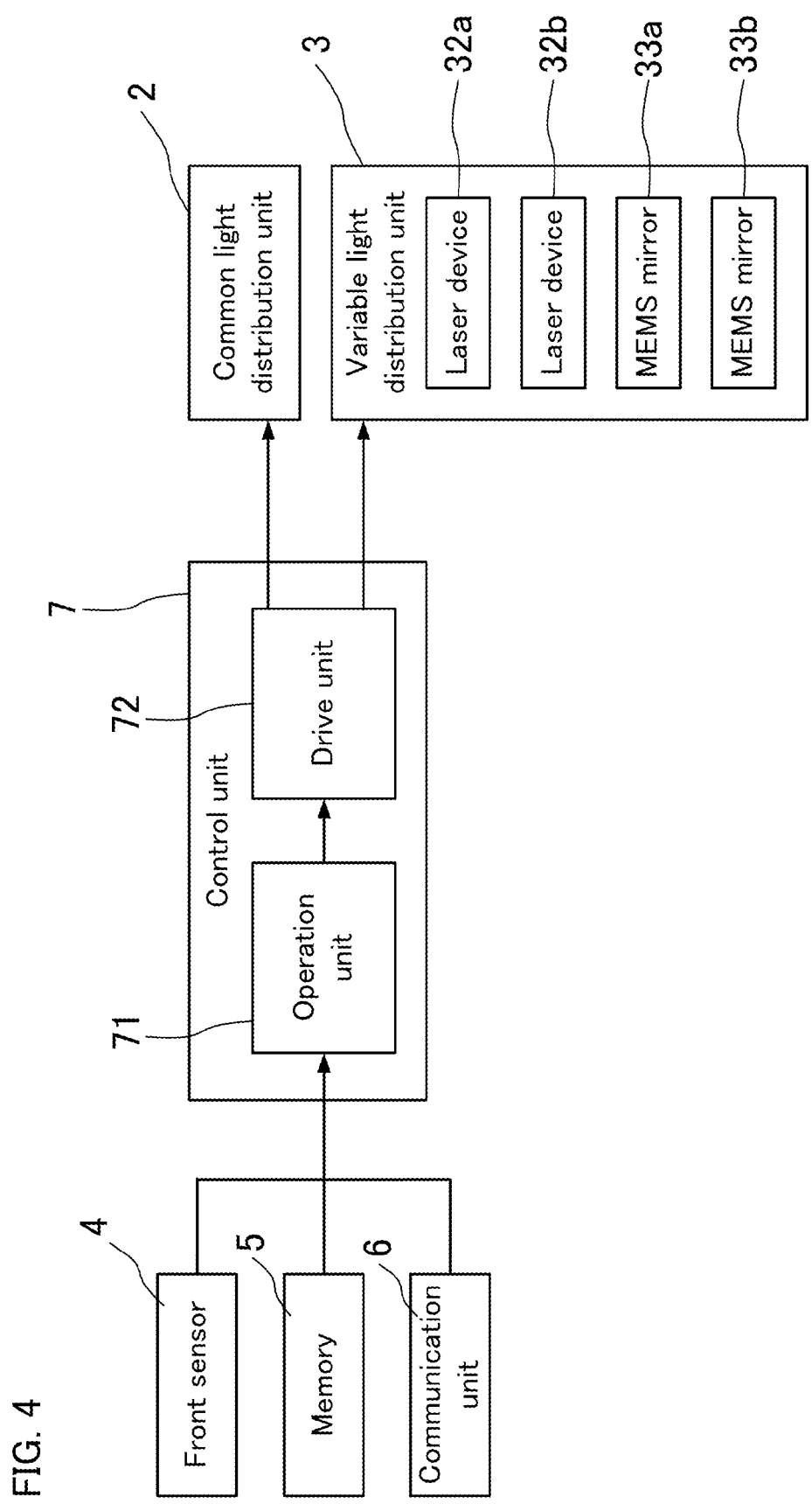
FIG. 4 is a block diagram showing a headlight system including the vehicle headlight of FIG. 1.

A control structure for the vehicle headlight 1 will now be described with reference to FIG. 4. FIG. 4 is a block diagram showing a headlight system including the vehicle headlight 1, which is composed of the common light distribution unit 2 and the variable light distribution unit 3. The headlight system including the vehicle headlight 1 can include: the common light distribution unit 2 forming the common light distribution pattern 10 shown in FIG. 2; the variable light distribution unit 3 forming a variable light distribution pattern; a front sensor 4 detecting surrounding information; a memory 5; and a communication unit 6.

The surrounding information detected by the front sensor 4 can mean an existence or a non-existence of a pedestrian, a bicycle, an oncoming vehicle, a frontward travelling vehicle, an obstacle and the like, and can include a road surface condition, weather condition, lighting condition, vehicle speed or acceleration, and other information that may be helpful in determining an optimal light distribution pattern. A camera, a radar detector, a sonic sensor, a thermocouple, a CCD array, and the like can be used as the front sensor 4. The memory 5 can memorize locating information such as a traffic signal, external lighting, a traffic sign and the like and a map information such as a road map including two-dimensional and three-dimensional geometric information.

The communication unit 6 can receive location information for the vehicle in which the system is incorporated, time information, weather information, etc., via communication with outside devices. The headlight system including the vehicle headlight 1 can also receive various information related to the memory 5 and the communication unit 6 from other devices included in the vehicle, such as from a navigation system, etc.

The control unit 7 can include an operation unit 71 and a drive unit 72. The operation unit 71 can receive various information output from the front sensor 4, the memory 5 and the communication unit 6 and can determine an optimum light distribution pattern, which should be projected by at least one of the common light distribution unit 2 and the variable light distribution unit 3. In addition, the control unit 7 can output information characteristics of the optimum light distribution pattern including a shape thereof and a light intensity distribution to the drive unit 72.

In this case, the information output from the front sensor 4, the memory 5 and the communication unit 6 can be sequentially updated. Therefore, determination of the optimum light distribution pattern and outputs of the information such as the shape and the light intensity distribution in regard to the optimum light distribution pattern can be repeated at a predetermined interval.

The drive unit 72 can control a light-emission of the common light distribution unit 2, and also can control each of the laser devices 32a, 32b and the MEMS mirrors 33a, 33b. Specifically, the drive unit 72 can control a respective slant angle and slant direction of the MEMS mirrors 33a, 33b while controlling a respective light intensity and lighting time of the blue light emitted from the laser devices 32a, 32b.

A forming process for a light distribution pattern formed by the headlight system will now be described with reference to FIG. 2 and FIG. 4. When the operation unit 71 determines the optimum light distribution pattern, if the common light distribution pattern 10 shown in FIG. 2 is not formed, the operation unit 71 can control the drive unit 72 so that the common light distribution unit 2 can form the common light distribution pattern 10 and so that the laser devices 32a, 32b and the MEMS mirrors 33a, 33b can form a variable light distribution pattern.

When the variable light distribution pattern is the upward pattern 12 for a high beam, the drive unit 72 can drive the laser device 32a and the MEMS mirror 33a so that the white light emitted from the laser device 32a via the phosphor panel 34 can be scanned on the upward pattern 12 for a high beam by the MEMS mirror 33a using a raster scanning method and/or a vector scanning method. Therefore, the headlight system including the vehicle headlight 1 can form a light distribution pattern for a high beam using the common light distribution pattern 10 formed by the common light distribution unit 2 and the upward pattern 12 for a high beam formed by the variable light distribution unit 3.

In this case, the laser device 32a can emit a region on the upward pattern 12 for a high beam with a brighter light intensity than other regions, for example, along a driving road in accordance with the information output from the front sensor 4, the memory 5 and the communication unit 6. Additionally, the laser device 32a can also emit lower light intensity to a region where an oncoming vehicle and a forward travelling vehicle drive are located as compared to other regions in accordance with the information output from the front sensor 4.

Here, when the vehicle corners rightward, the drive unit 72 can drive the laser device 32b and the MEMS mirror 33b so that the white light emitted from the laser device 32b via the phosphor panel 34 can be scanned on the right cornering pattern 13a by the MEMS mirror 33b as shown in FIG. 2. Accordingly, because the headlight system including the vehicle headlight 1 can form the common light distribution pattern 10, the upward pattern 12 and the right cornering pattern 13a by the common light distribution unit 2 and the variable light distribution unit 3, the headlight system can improve a visibility for a driver.

When the vehicle drives in a downtown area, the drive unit 72 can drive the laser device 32a and the MEMS mirror 33a so that the white light emitted from the laser device 32a via the phosphor panel 34 can be scanned on the elbow pattern 11 for a low beam by the MEMS mirror 33a while driving the common light distribution unit 2 forming the common light distribution pattern 10. In this case, because the headlight system can form the common light distribution pattern 10 and the elbow pattern 11, the headlight system can improve a visibility for a driver while the headlight 1 does not give a glaring type light to an oncoming vehicle.

Here, during wet weather, the drive unit 72 can drive the laser device 32b and the MEMS mirror 33b so that the white light emitted from the laser device 32b via the phosphor panel 34 can be scanned on the downward pattern 14 by the MEMS mirror 33b. Therefore, because the headlight system can form the common light distribution pattern 10, the elbow pattern 11 and the downward pattern 14, the headlight system can improve visibility for a driver while the headlight 1 does not give a glaring type light to an oncoming vehicle and while the driver can avoid rain puddles and the like.

As described above, by controlling each of the light intensities of the blue laser lights emitted from the laser devices 32a, 32b and each of the slant angles and slant directions of the MEMS mirrors 33a, 33b, each of the reflected lights emitted from the laser devices 32a, 32b and reflected by the MEMS mirrors 33a, 33b can be scanned on the phosphor panel 34 so as to form a prescribed light distribution pattern. White light having a shape and a light intensity corresponding to the prescribed light distribution pattern can be emitted from the phosphor panel 34 and then can be projected in a light-emitting direction of the vehicle headlight 1 via the projector lens 40.

Therefore, the prescribed light distribution pattern corresponding to the reflected lights scanned on the phosphor panel 34 can be formed as the variable light distribution pattern, which is located adjacent the common light distribution pattern 10. Thereby, a large number of light-emitting devices or micro mirrors is not required for the vehicle headlight 1, unlike the conventional headlights, and the vehicle headlight 1 can freely vary an optimum light distribution pattern by changing each of light intensities of the laser devices 32a, 32b and each of the slant angles and slant directions of the MEMS mirrors 33a, 33b.

Thus, the vehicle headlight 1 can be formed with a simple structure and in a small size, and can form various light distribution patterns to improve a visibility for a driver in accordance with various driving conditions such as existence or non-existence of a pedestrian, an oncoming vehicle and the like and a climate, a road condition, a driving condition, etc. Additionally, because the vehicle headlight 1 includes two pair of the laser devices 32a, 32b and the MEMS mirrors 33a, 33b, a possibility of light distribution pattern projected by the vehicle headlight 1 can increase, and even when a pair of the laser devices and the MEMS mirrors is out of order, the vehicle headlight 1 can form the various light distribution patterns so as to be able to safely drive by another pair of the laser devices and the MEMS mirrors.

Moreover, because the vehicle headlight 1 can form the optimum light distribution pattern by emitting light on only a necessary region from the laser devices 32a, 32b, a power consumption for the laser devices 32a, 32b can be inhibited in comparison to the conventional headlight, which always emits light on all illuminating region from a light source and shields a part of the light by shades in accordance with a light distribution pattern.

Furthermore, because the vehicle headlight 1 does not include a movable portion other than the MEMS mirrors 33a, 33b, the vehicle headlight 1 can have high endurance as compared to the conventional headlights, which by contrast forms a variable light distribution pattern by moving shades. The vehicle headlight 1 can be configured to avoid leakage of the blue laser lights emitted from the laser devices 32a, 32b to the outside because the light source module 30 is sealed with the casing 31 and the radiator 31a, and therefore can also maintain high safety.

Figure 5:
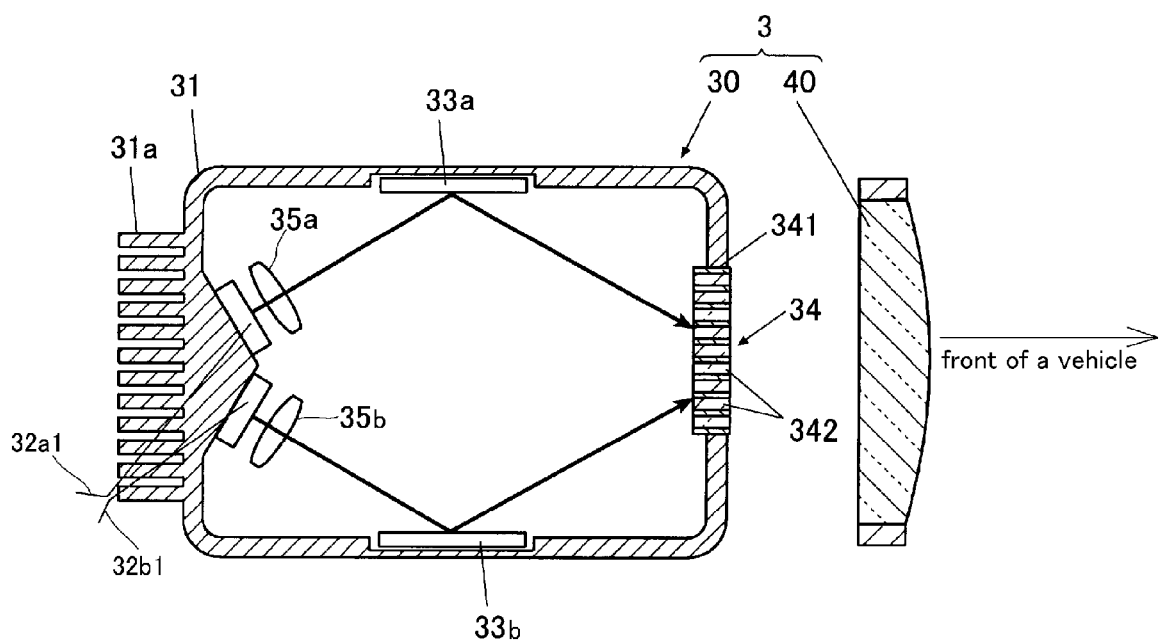
FIG. 5 is a schematic side cross-section view showing an exemplary variation of a variable light distribution unit included in the vehicle headlight of FIG. 1.

Exemplary variations of the above-described vehicle headlight 1 will now be described. FIG. 5 is a schematic side cross-section view showing an exemplary variation of the variable light distribution unit 3 included in the vehicle headlight 1. In place of the laser devices 32a, 32b, blue LED devices 32a1, 32b1 can be used as the light sources. In this case, because the blue LED devices 32a1, 32b1 have a generally Lambertian characteristic, unlike the laser devices 32a, 32b, collimator lenses 35a, 35b can be located between the LED device 32a1 and the MEMS mirror 33a and between the LED device 32b1 and the MEMS mirror 33b to gather light emitted from the blue LED devices 32a, 32b1 toward the MEMS mirrors 33a, 33b, respectively.

In addition, a red phosphor wavelength-converting blue light emitted from the blue LED devices 32a1, 32b1 into red-purple light and a green phosphor wavelength-converting the blue light into blue-green light can also be used in place of the yellow phosphor as the wavelength converting material for the phosphor 342. In this case, the blue LED devices 32a1, 32b1 can also emit light having substantially white light by an additive color mixture of the red-purple light that is excited by the blue light, the blue-green light emitted from the green phosphor and a part of the blue light via the phosphor 342 of the phosphor panel 34 including the red phosphor and the green phosphor.

The red phosphor can include $CaAlSiN_3:Eu^{2+}$, $Ca_2Si_5N_8$: $Eu^{2+}$, $La_2O_2S:Eu^{3+}$, $KSiF_6:Mn^{4+}$, $KTiF_6:Mn^{4+}.Y_3(Ga, Al)_5O_{12}:Ce^{3+}$, $Ca_3Sc_2Si_3O_{12}:Ce^{3+}$, $CaSc_2O_4:Eu^{2+}$, $(Ba, Sr)_2SiO_4:Eu^{2+}$, $Ba_3Si_6O_{12}N_2:Eu^{2+}$, $(Si, Al)_6(O, N):Eu^{2+}$ and the like can be used as the green phosphor. LEDs of InGaN series that emit near-ultraviolet light having a wavelength of approximately 380 nanometers, a laser diode that emits ultraviolet light and the like can also be used as the light source in place of the blue LED devices 32a1, 32b1. In this case, in order to emit the substantially white light, the phosphor 342 of the phosphor panel 34 can include: a red phosphor wavelength-converting the ultraviolet light into red light; a green phosphor wavelength-converting the ultraviolet light into green light; and a blue phosphor wavelength-converting the ultraviolet light into blue light.

$CaAlSiN_3:Eu^{2+}$, $Ca_2Si_5N_8:Eu^{2+}$, $La_2O_2S:Eu^{3+}$, $KSiF_6: Mn^{4+}$, $KTiF_6:Mn^{4+}$ and the like can be used as the red phosphor. $(Si, Al)_6(O, N):Eu^{2+}$, $BaMgAl_{10}O_{17}:Eu^{2+}Mn^{2+}$, $(Ba, Sr)_2SiO_4:Eu^{2+}$ and the like can be used as the green phosphor. $(Sr, Ca, Ba, Mg)_{10}(PO_4)_6C_{12}:Eu^{2+}$, $BaMgAl_{10}O_{17}:Eu^{2+}$, $LaAl(Si, Al)_6(N, O)_{10}:Ce^{3+}$ can be used as the blue phosphor. In this case, three holes 341a including the red phosphor, the green phosphor and the blue phosphor can be located in turn by a triplet location, a quad location, etc.

The laser diode emitting the ultraviolet light can emit various color lights other than white light via the phosphor panel 34 that includes at least one of the red phosphor, the green phosphor and the blue phosphor. For example, when a light distribution pattern having yellow light is emitted for a fog lamp, the light distribution pattern having the yellow light may be formed by the ultraviolet light emitted from the laser diode via the phosphor panel 34 including the red phosphor and the green phosphor.

Figure 6:
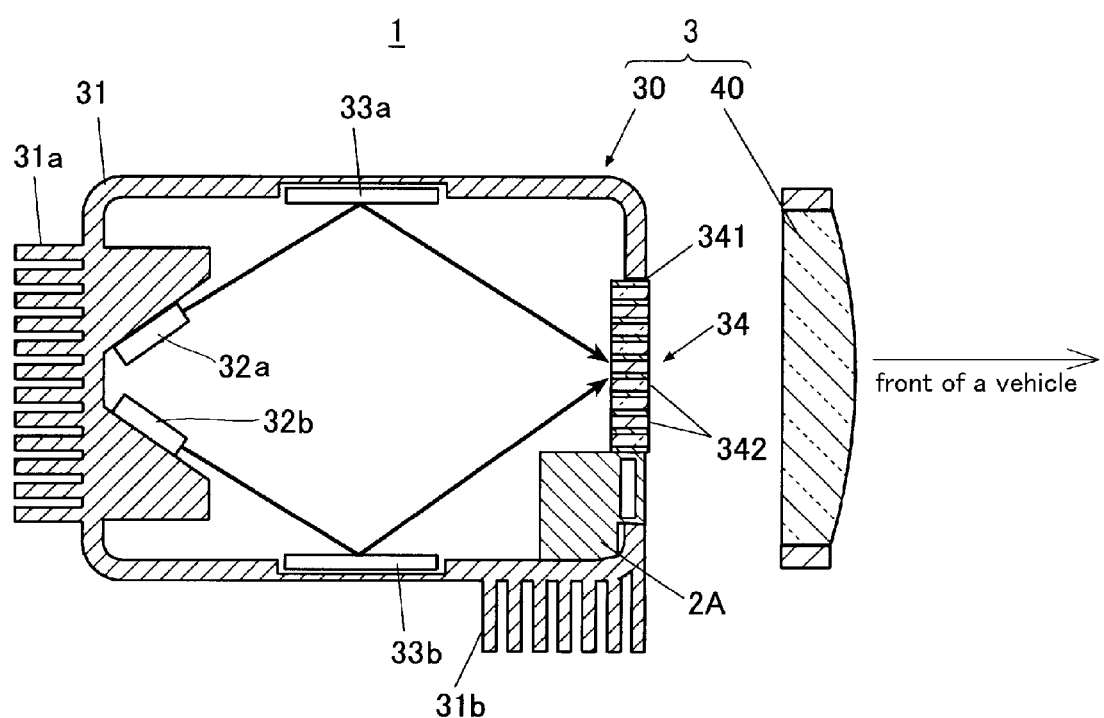
FIG. 6 is a schematic side cross-section view showing an exemplary variation of the vehicle headlight of FIG. 1.

FIG. 6 is a schematic side cross-section view showing an exemplary variation of the vehicle headlight 1 of FIG. 1. In the vehicle headlight 1 shown in FIG. 1, the common light distribution unit 2 can be separately located adjacent the variable light distribution unit 3. In place of the common light distribution unit 2, a common light distribution unit 2A can be integrally located in the variable light distribution unit 3. The common light distribution unit 2A can be located adjacent the phosphor panel 34 and can share the projector lens 40 with the variable light distribution unit 3. In this case, a radiator 31*b* can be located adjacent the common light distribution unit 2A to radiate heat developed from the common light distribution unit 2A.

In addition, the variable light distribution unit 3 can form all light distribution patterns including the common light distribution pattern 10 shown in FIG. 2 without the common light distribution units 2 and 2A. In this case, if at least one of the laser devices 32*a*, 32*b* and the MEMS mirrors 33*a*, 33*b* is out of order, a fail-safe can be provided that projects only the common light distribution pattern 10.

Figure 7A:
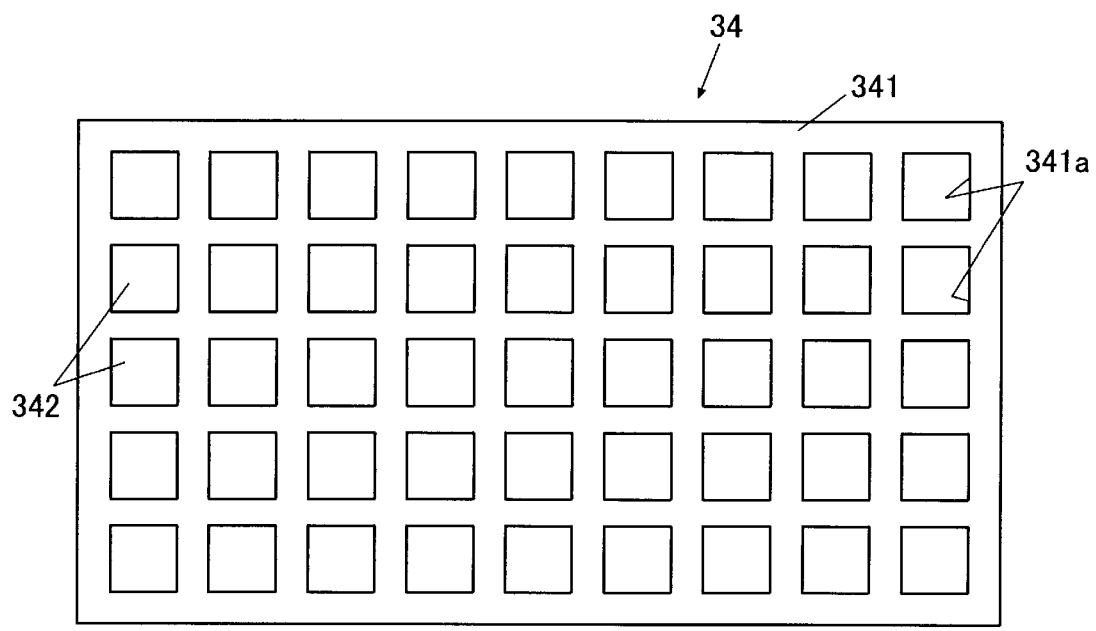
FIGS. 7a and 7b are a front view and a side cross-section view showing an exemplary variation of the phosphor panel of FIGS. 3a and 3b, respectively.
Figure 7B:
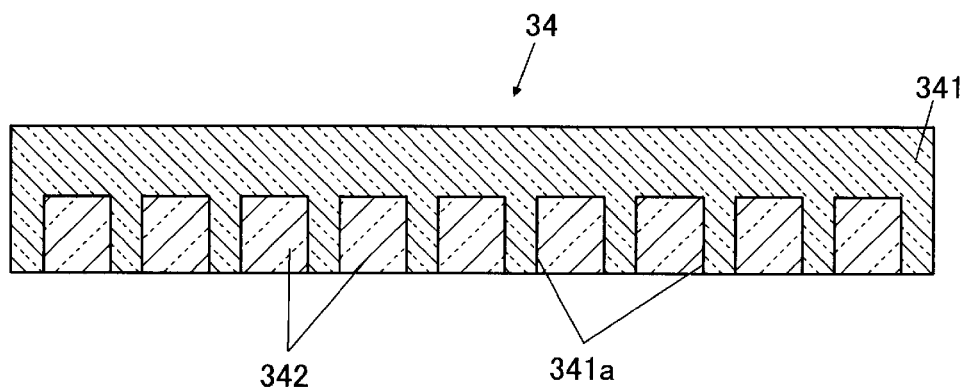
Figure 8A:
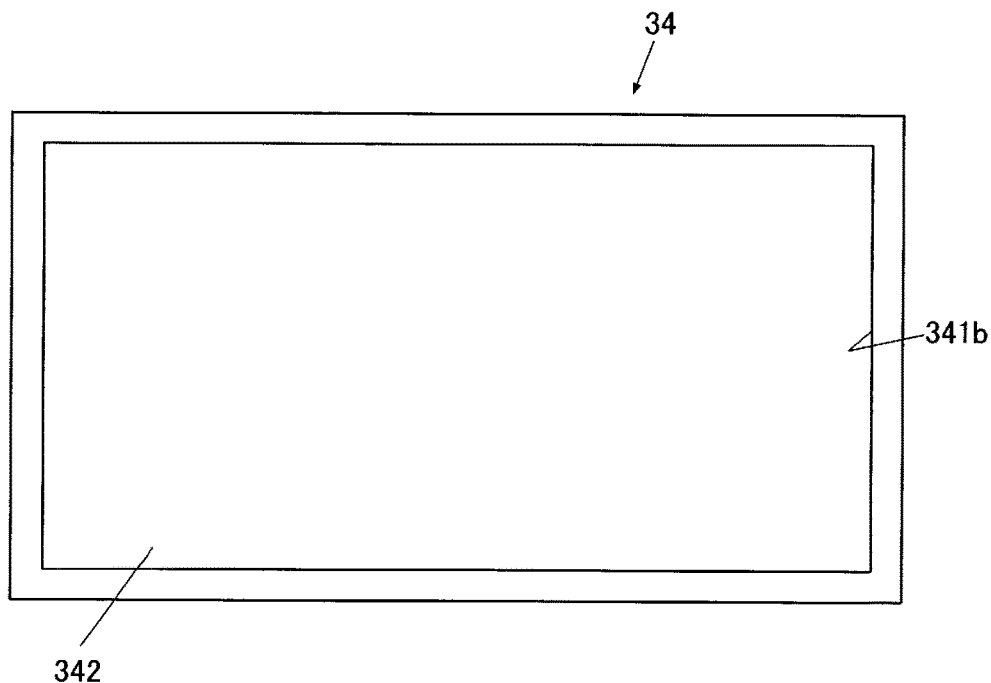
FIGS. 8a and 8b are a front view and a side cross-section view showing another exemplary variation of the phosphor panel of FIGS. 3a and 3b, respectively.
Figure 8B:
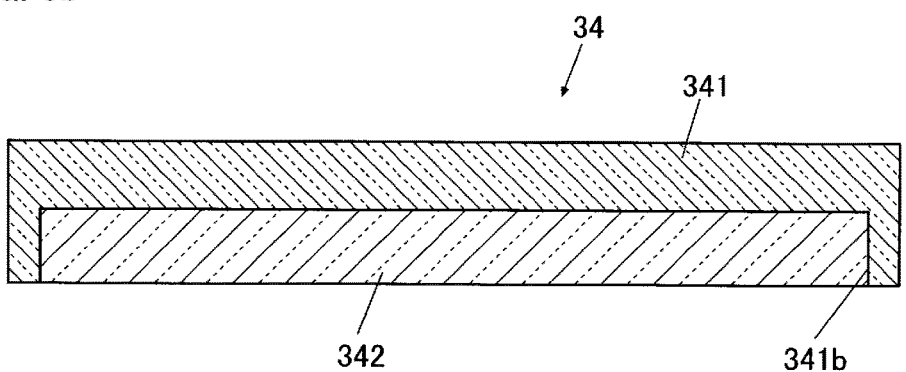
Figure 9A:
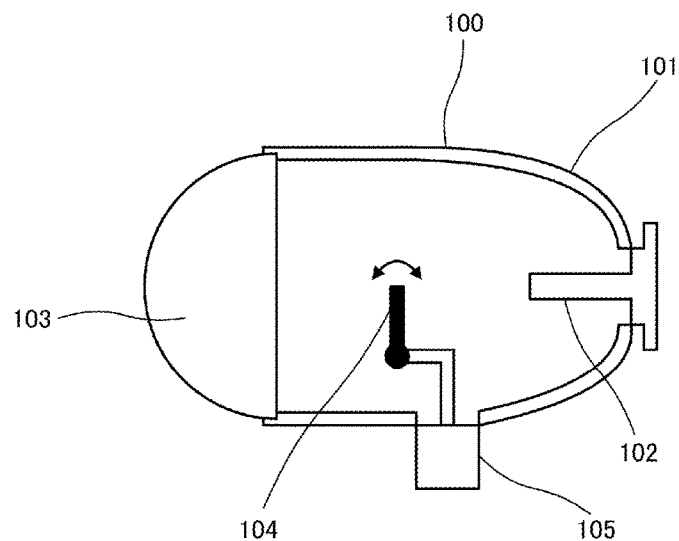
FIG. 9a is a schematic side cross-section view showing a right and left conventional vehicle headlight.
Figure 9B:
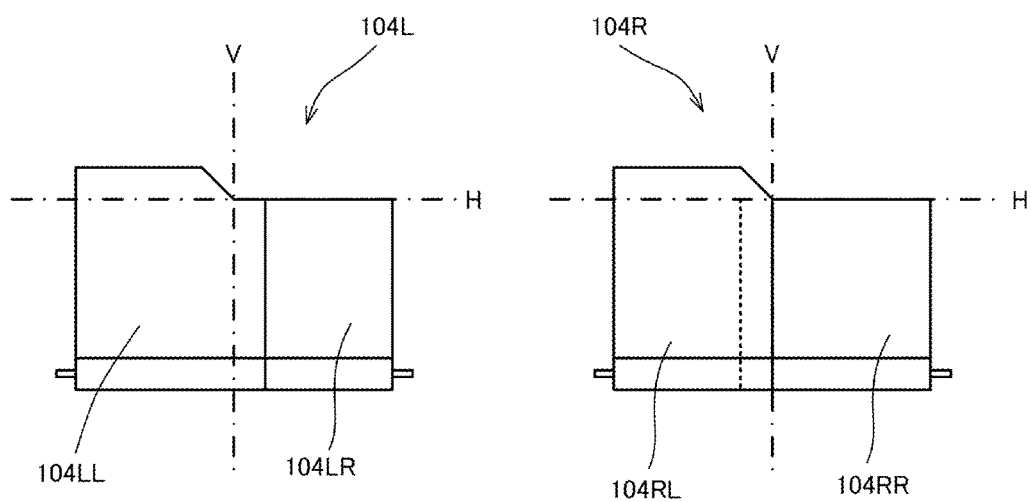
Figure 10:
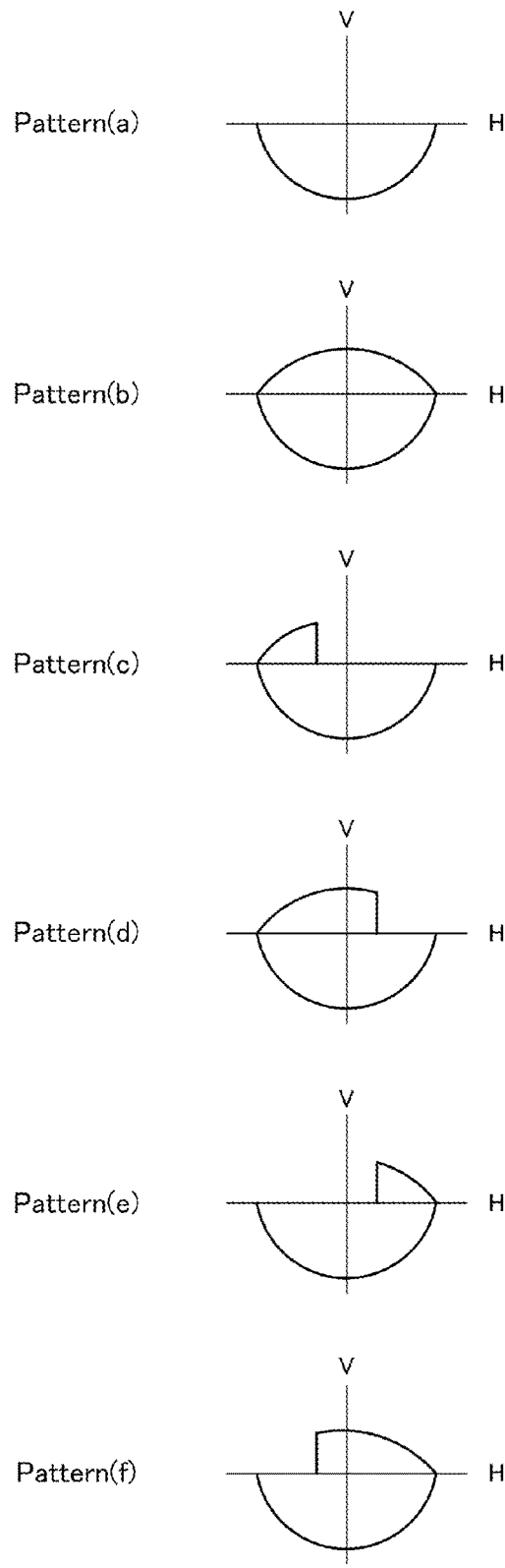
Figure 11:
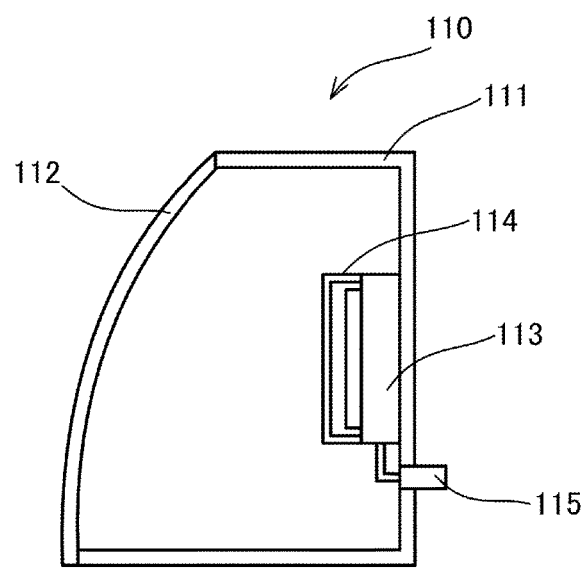
FIG. 11 is a schematic side cross-section view showing another conventional vehicle headlight.
Figure 12:
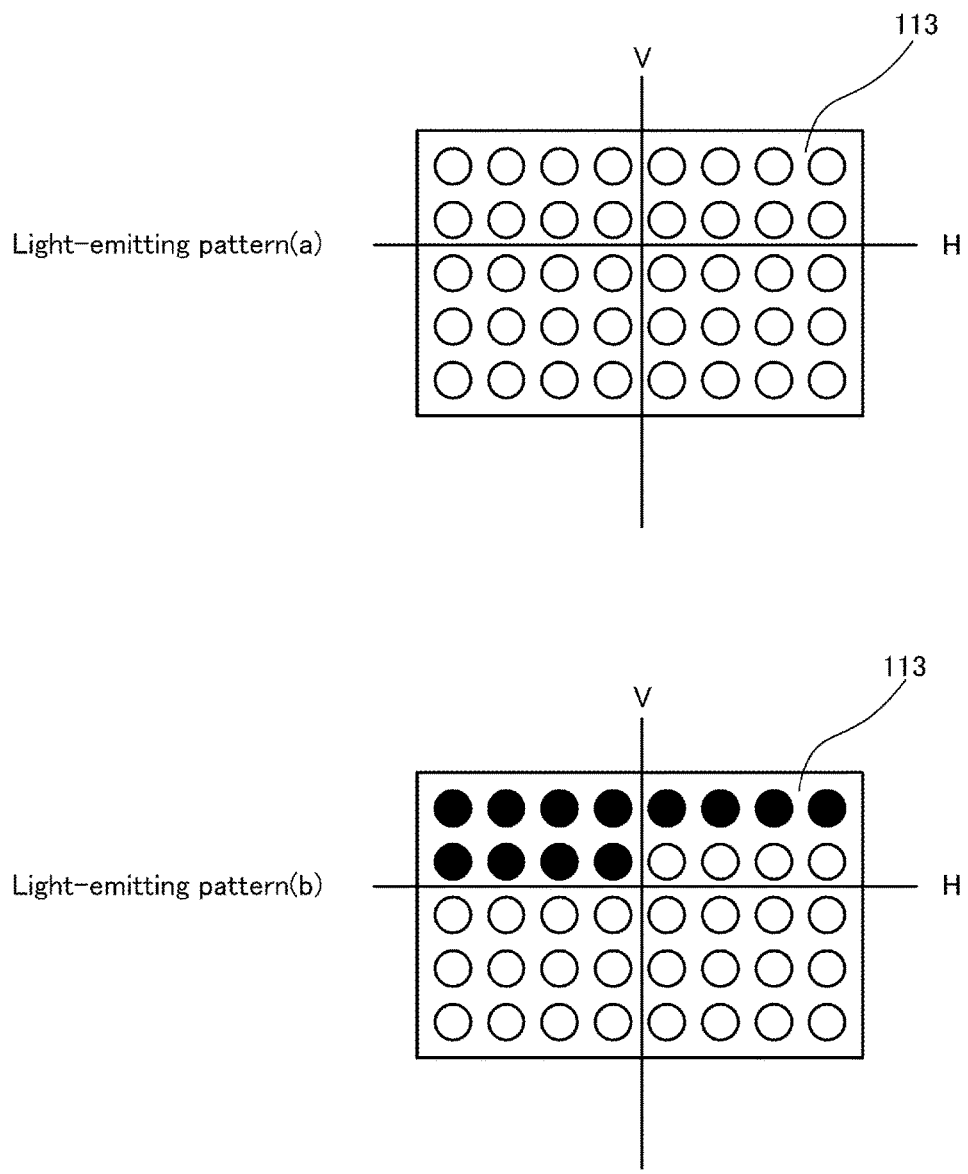
FIG. 12 is a diagram showing exemplary light-emitting patterns formed by a matrix light source used for the vehicle headlight of FIG. 11.
Figure 13:
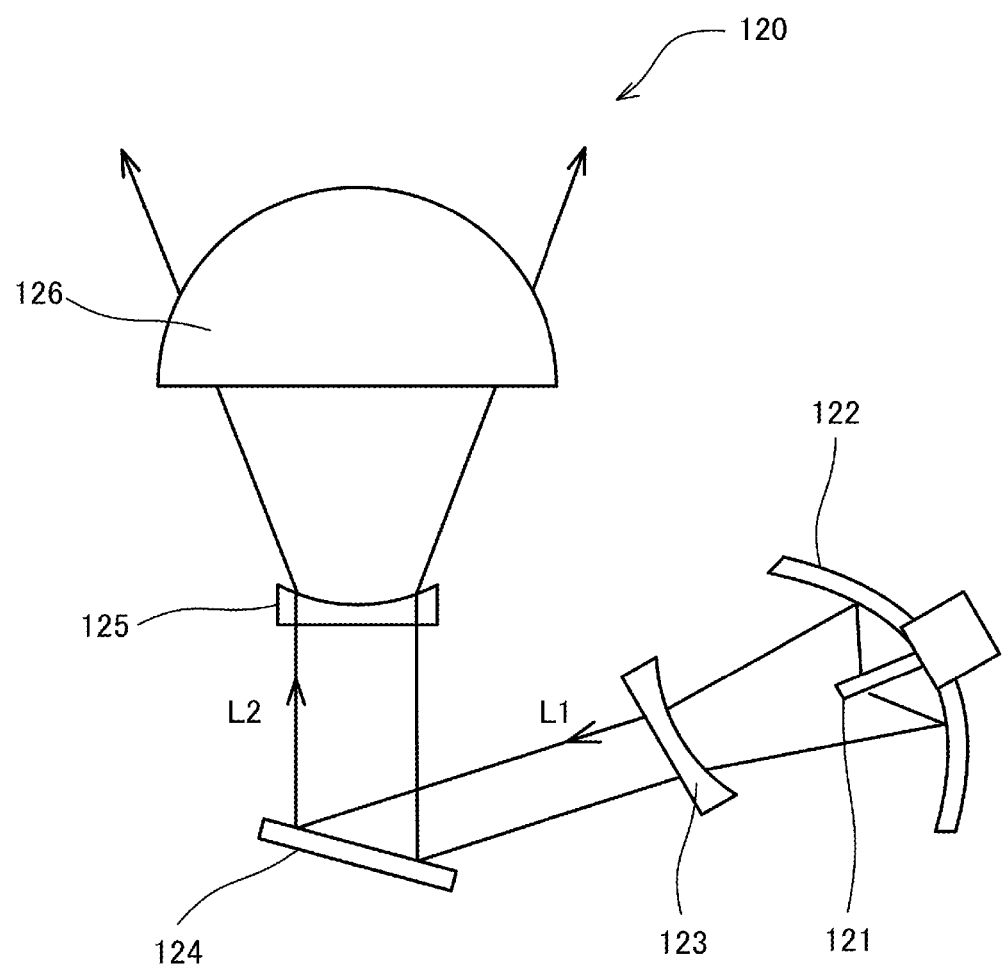
FIG. 13 is a schematic side cross-section view showing another conventional vehicle headlight.
Figure 14:
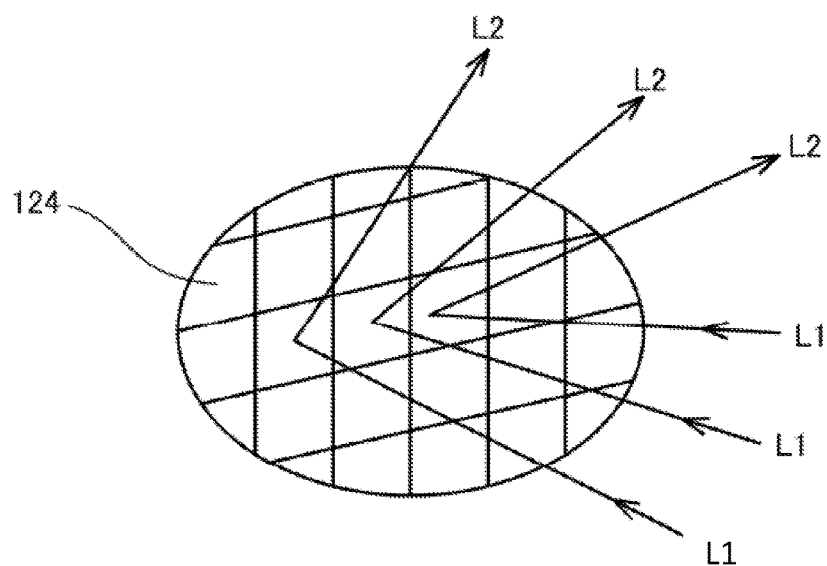
FIG. 14 is a partial close-up perspective view showing a matrix mirror used for the conventional vehicle headlight of FIG. 13.

FIGS. 7*a* and 7*b* are a front view and a side cross-section view showing an exemplary variation of the phosphor panel 34, respectively, and FIGS. 8*a* and 8*b* are a front view and a side cross-section view showing another exemplary variation of the phosphor panel 34, respectively. It is not necessary for the holes 341*a* to pass through the frame 341 as shown in FIGS. 7*a* and 7*b*, and each of the holes 341*a* can be formed in a cavity shape. Furthermore, a single cavity 341*b* as shown in FIGS. 8*a* and 8*b* can be provided for the phosphor 342 of the phosphor panel 34 in place of the multiple holes 341*a*.

In addition, a micro lens array including a plurality of micro lenses can be located in each of the holes 341*a* toward the projector lens 40 in accordance with an optical characteristic of the light distribution pattern. When the holes 341*a* and the opening 341*b* do not pass through the frame 341 as shown in FIGS. 7*a*, 7*b* and FIGS. 8*a*, 8*b*, the micro lens array can be integrated with the frame 341 so that the phosphor 342 is located between the micro lens and the frame 341.

Moreover, the laser devices 32*a*, 32*b* and the MEMS mirrors 33*a*, 33*b* cannot be limited to the two pairs. A pair of the laser devices and the MEMS mirrors can be located in the casing 31, and two casings 31 including the pair of the laser devices and the MEMS mirrors can be adjacently located for the vehicle headlight 1. Four pairs of the laser devices and the MEMS mirrors can also be provided in a right, left, top and bottom directions of the casing 31.

In this case, a cross-section of the casing 31 can be formed in a rectangular shape so that two of the MEMS mirrors face with respect to each other. A polygon mirror can also be used as the mirror member, if the laser light can be scanned on the phosphor panel 34. Furthermore, the headlight system can also receive the map information from other devices via the communication unit 6 without necessarily providing the map information on the memory 5.

As described above, the vehicle headlight 1 can include the common light distribution unit 2 forming the common light distribution pattern and the variable light distribution unit 3 forming the variable light distribution pattern. The variable light distribution unit 3 can be composed of two pairs of the light source and the mirror, and therefore can be formed with a simple structure. The headlight system including the vehicle headlight 1 can include the front sensor 4 for detecting the surrounding condition(s) and at least one of the memory 5 and communication unit 6 to receive the map information and the like while controlling the common light distribution pattern 2 and the variable light distribution unit 3. Thus, the disclosed subject matter can provide a vehicle headlight formed with a compact structure and a headlight system including the vehicle headlight that can form various optimum light distribution patterns to enhance visibility for a driver in accordance with the surrounding condition, the map information, etc.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. A vehicle headlight comprising:
   a phosphor panel having an incident surface and an output surface facing the incident surface;
   a casing having a first end, a second end and a space located between the first end and the second end, and the space of the casing including a first inner surface and a second inner surface facing the first inner surface;
   a first light source located in the space toward the first end of the casing so that light emitted from the first light source is directed toward the first inner surface of the casing; and
   a first mirror located adjacent the first inner surface of the casing, the light emitted from the first light source being reflected toward the incident surface of the phosphor panel, and the first mirror being configured to be movable in two directions so as to freely vary a reflecting direction of the light and configured to scan the light emitted from the first light source on the incident surface, wherein the vehicle headlight provides at least two light distribution patterns or more by using the first light source and the first mirror, and wherein the phosphor panel includes a frame either having at least one hole, which includes a wavelength converting material in the at least one hole, or having at least one cavity, which includes the wavelength converting material in the at least one cavity located toward the incident surface of the phosphor panel.

2. The vehicle headlight according to claim 1, wherein the phosphor panel include at least one of a glass and a silicone.

3. A headlight system including the vehicle headlight according to claim 2, comprising:
   a front sensor configured to detect surrounding information;
   an operation unit configured to receive data related to the surrounding information from the front sensor and configured to determine an optimum light distribution pattern; and
   a drive unit configured to receive data related to the optimum light distribution pattern from the operation unit and configured to control the common light distribution unit, the first light source and the first mirror in accordance with the data related to the optimum light distribution pattern.

4. The headlight system according to claim 3, further comprising:

at least one of a memory and a communication unit configured to receive map information.

5. The vehicle headlight according to claim 1, wherein the phosphor panel includes the frame having either a plurality of the holes or a plurality of the cavities, and further includes a projector lens toward the output surface of the phosphor panel, which is integrated into the frame.

6. A headlight system including the vehicle headlight according to claim 5, comprising:
a front sensor configured to detect surrounding information;
an operation unit configured to receive data related to the surrounding information from the front sensor and configured to determine an optimum light distribution pattern; and
a drive unit configured to receive data related to the optimum light distribution pattern from the operation unit and configured to control the common light distribution unit, the first light source and the first mirror in accordance with the data related to the optimum light distribution pattern.

7. The headlight system according to claim 6, further comprising:
at least one of a memory and a communication unit configured to receive map information.

8. The vehicle headlight according to claim 1, further comprising: a common light distribution unit located adjacent the casing.

9. The vehicle headlight according to claim 1, further comprising:
a collimator lens located between the first light source and the first mirror, wherein the first light source is an ultraviolet LED device and the phosphor panel includes a wavelength converting material including at least one of a red phosphor, a green phosphor and a blue phosphor.

10. The vehicle headlight according to claim 1, further comprising:
a collimator lens located between the first light source and the first mirror, wherein the first light source is a blue LED device and the phosphor panel includes a wavelength converting material that is selected from the group consisting of a yellow phosphor, and two phosphors including a red phosphor and a green phosphor.

11. A headlight system including the vehicle headlight according to claim 1, comprising:
a front sensor configured to detect surrounding information;
an operation unit configured to receive data related to the surrounding information from the front sensor and configured to determine an optimum light distribution pattern; and
a drive unit configured to receive data related to the optimum light distribution pattern from the operation unit and configured to control the first light source, the first mirror, the second light source and the second mirror in accordance with the data related to the optimum light distribution pattern.

12. The headlight system according to claim 11, further comprising:
at least one of a memory and a communication unit configured to receive map information.

13. A vehicle headlight comprising:
a phosphor panel having an incident surface and an output surface facing the incident surface;
a casing having a first end, a second end and a space located between the first end and the second end, and the space of the casing including a first inner surface and a second inner surface facing the first inner surface;
a first light source located in the space toward the first end of the casing so that light emitted from the first light source is directed toward the first inner surface of the casing; and a first mirror located adjacent the first inner surface of the casing, the light emitted from the first light source being reflected toward the incident surface of the phosphor panel, and the first mirror being configured to be movable in two directions so as to freely vary a reflecting direction of the light and configured to scan the light emitted from the first light source on the incident surface,
wherein the vehicle headlight provides at least two light distribution patterns or more by using the first light source and the first mirror, and
wherein the phosphor panel is located adjacent the second end of the casing.

14. A vehicle headlight comprising:
a phosphor panel having an incident surface and an output surface facing the incident surface;
a casing having a first end, a second end and a space located between the first end and the second end, and the space of the casing including a first inner surface and a second inner surface facing the first inner surface;
a first light source located in the space toward the first end of the casing so that light emitted from the first light source is directed toward the first inner surface of the casing; and
a first mirror located adjacent the first inner surface of the casing, the light emitted from the first light source being reflected toward the incident surface of the phosphor panel, and the first mirror being configured to be movable in two directions so as to freely vary a reflecting direction of the light and configured to scan the light emitted from the first light source on the incident surface, wherein the vehicle headlight provides at least two light distribution patterns or more by using the first light source and the first mirror; and
a collimator lens located between the first light source and the first mirror, wherein the first light source is a blue LED device and the phosphor panel includes a wavelength converting material that is selected from the group consisting of a yellow phosphor, and two phosphors including a red phosphor and a green phosphor.

\* \* \* \* \*